United States Patent Office 3,068,689
Patented Dec. 18, 1962

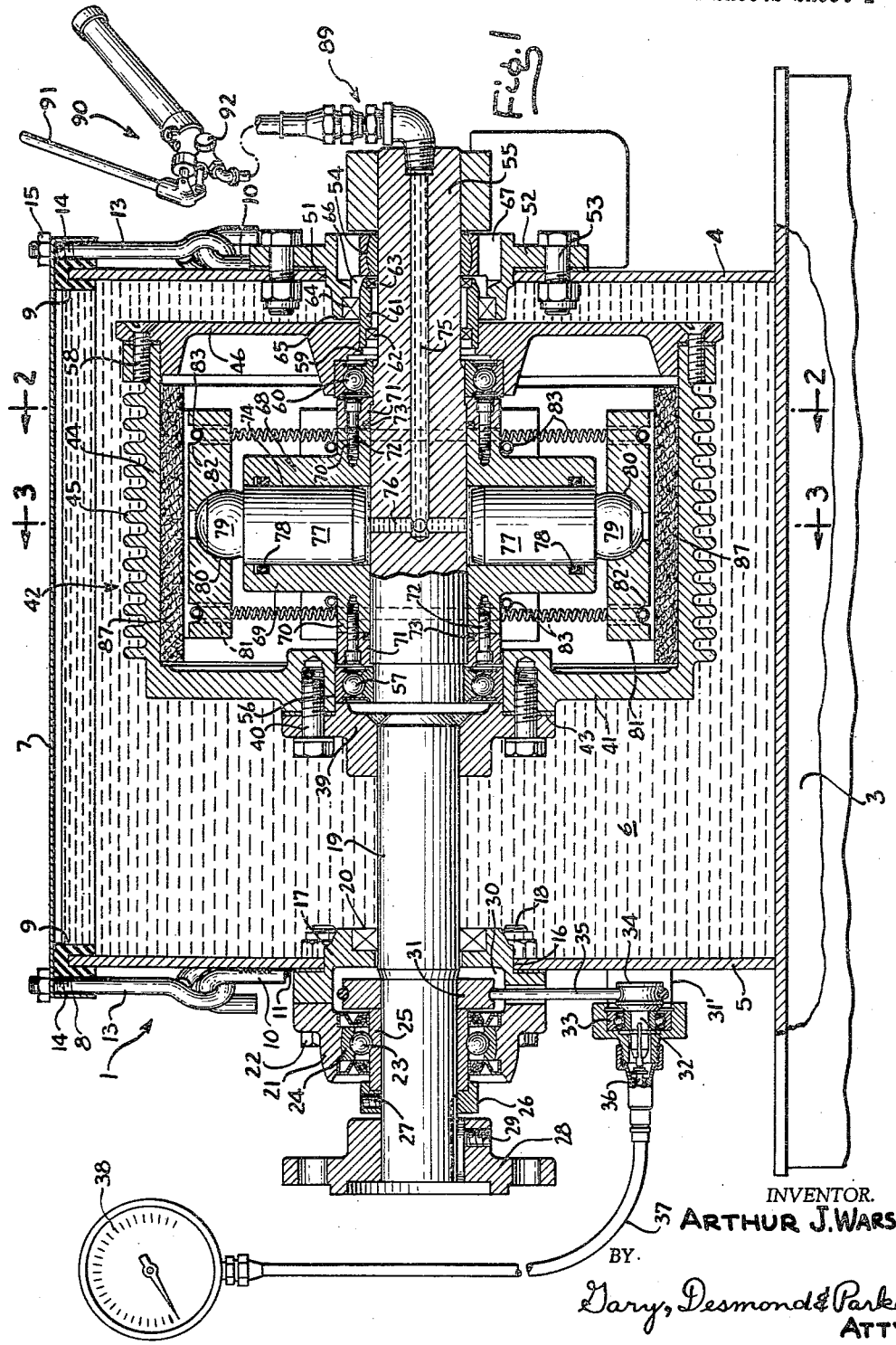

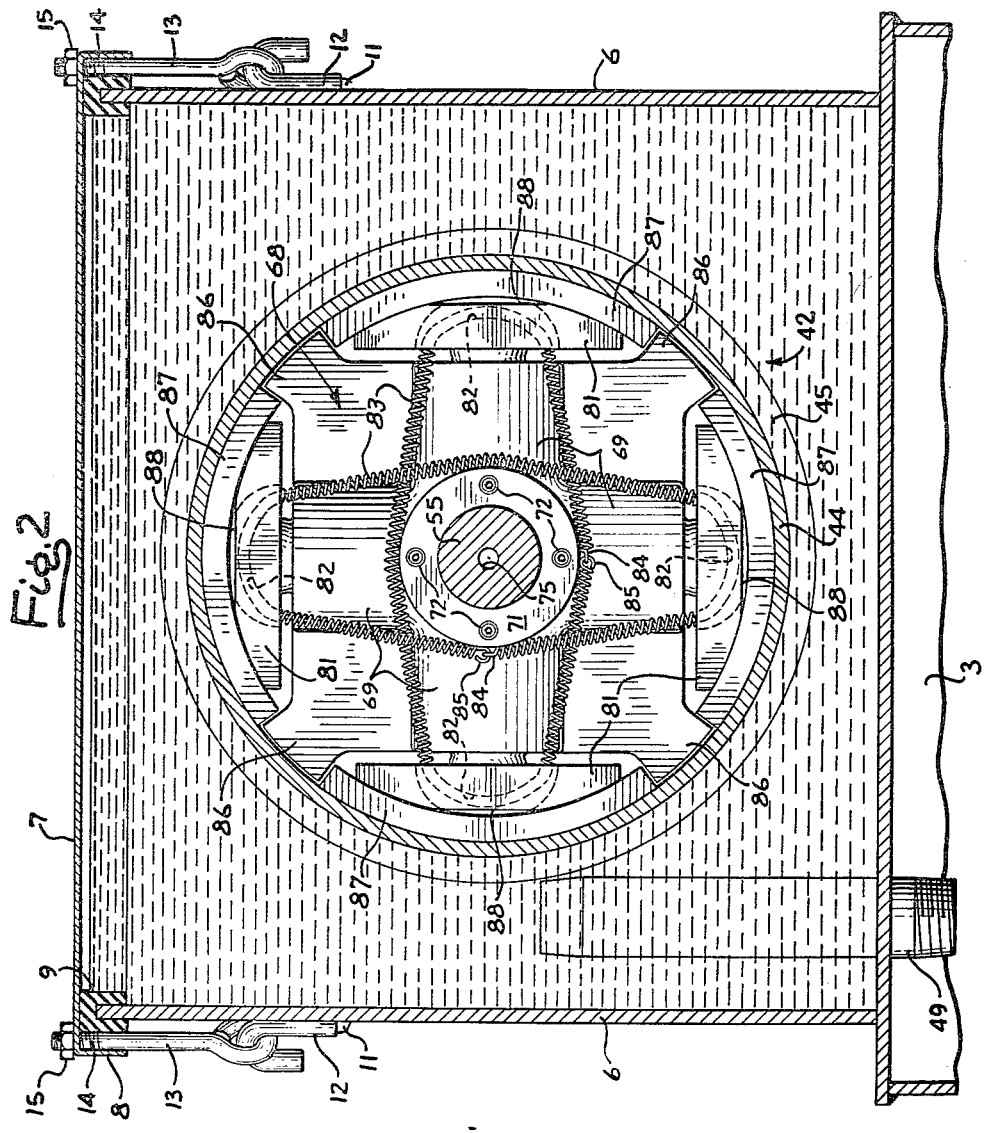
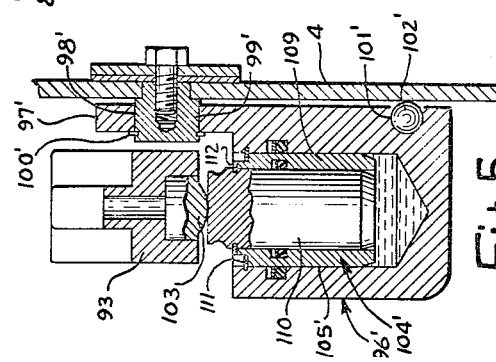

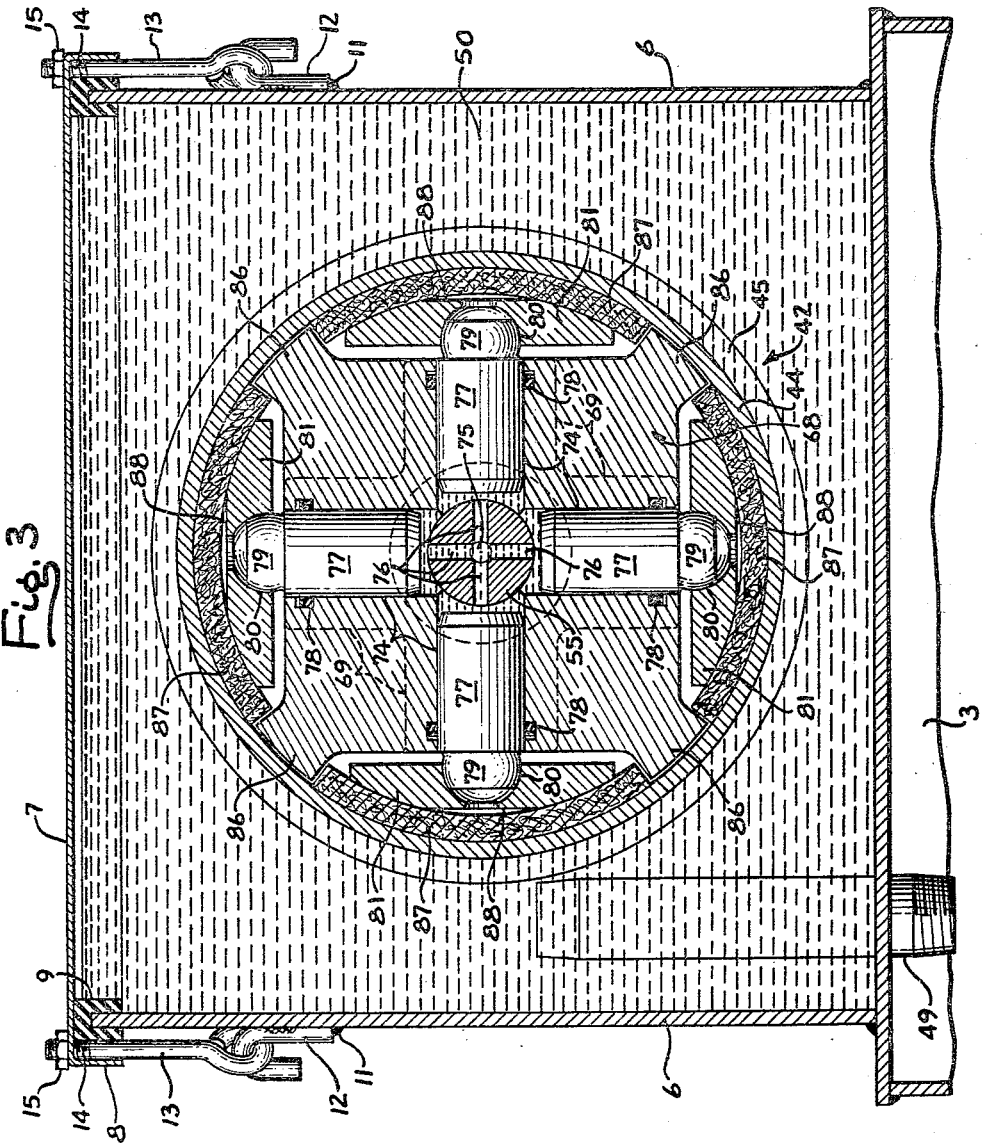

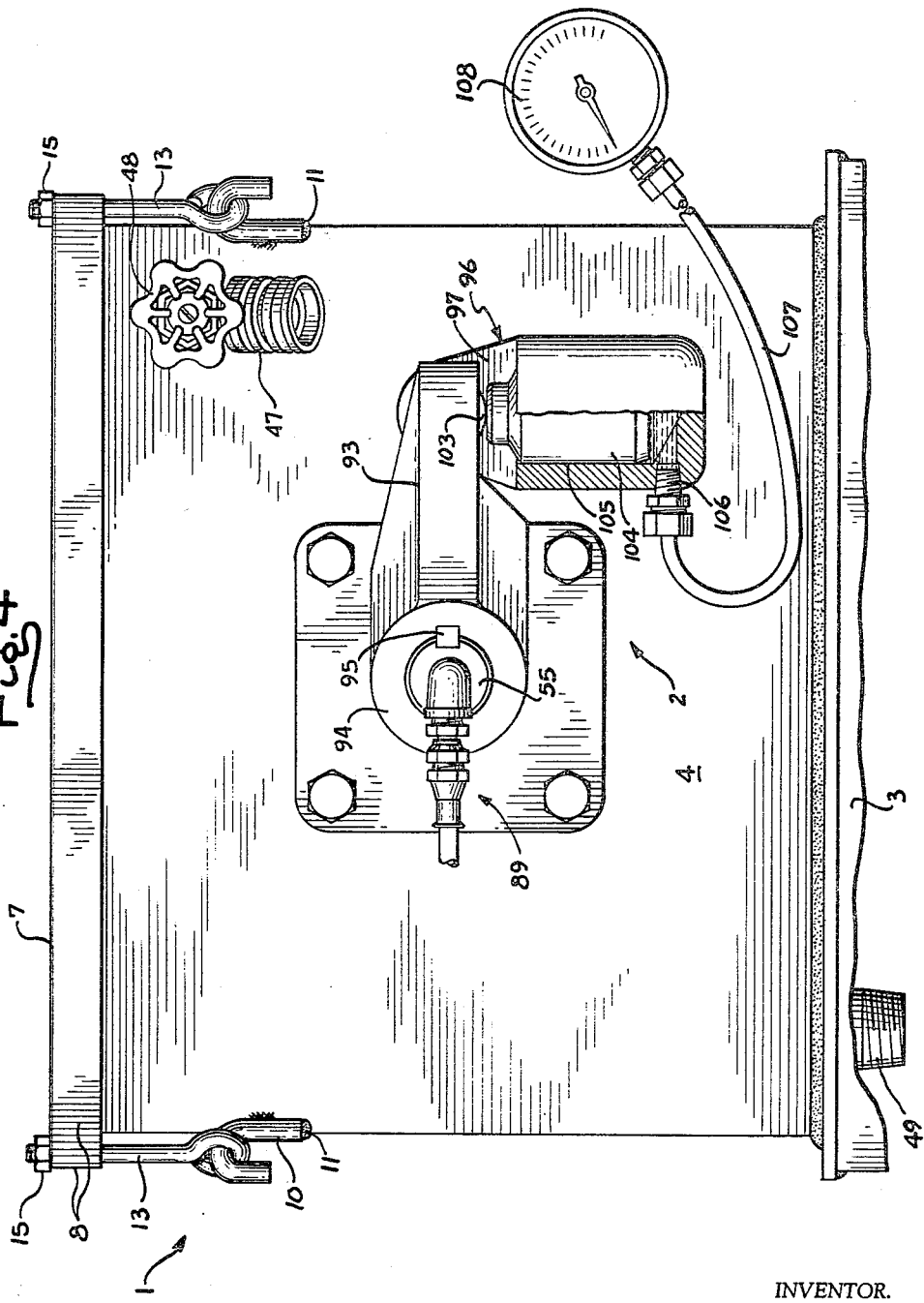

3,068,689
DYNAMOMETER AND POWER ABSORPTION DEVICE
Arthur J. Warsaw, Colfax, Ill.
Filed Nov. 12, 1958, Ser. No. 773,268
10 Claims. (Cl. 73—135)

This invention relates to improvements in a dynamometer and power absorption device and refers particularly to a device of the character described wherein a prime mover may be accurately and constantly loaded and wherein the power may be dissipated rapidly and at a substantially constant rate and in an efficient manner.

The present invention relates to that type of dynamometer wherein the energy of a prime mover may be converted into heat by friction means, the friction applying means being such and the heat dissipation means being such, that a substantially constant controlled load may be applied to the prime mover and the friction-applying means, the brake linings, will not be excessively worn or rapidly disintegrated.

Briefly described, the device comprising the present invention comprises a stationary casing which is filled with, and through which a cooling liquid is circulated. A hollow liquid-tight drum is positioned in the casing and is immersed in the cooling liquid. Means is contemplated for rotating the drum within the casing, the drum being operatively connected to a prime mover under test. Braking means is positioned within the drum for loading the prime mover, the braking force being remotely controlled, and where the device is to be used as a dynamometer, measuring means is associated with the braking means to measure the torque exerted by the drum on the braking means. Where the device is used merely as a power absorption unit, no measuring means is employed with the braking means.

One of the important features of the invention resides in the fact that the drum, carrying the braking means, that is, the seat of energy conversion, is completely immersed in a circulating cooling liquid and the energy-converting surfaces are efficiently and uniformly cooled.

Another feature of the invention resides in a braking force applying mechanism which is remotely controlled, preferably being located at a control station wherein all factors pertaining to the test, such as, torque readings, r.p.m. readings, etc. are under the ready observation of the operator.

A further feature of the invention resides in the unique manner in which the brake linings are mounted in the braking mechanism whereby said linings may be removed or changed with the expenditure of a minimum of time and labor.

An additional feature of the invention resides in a unique force applying mechanism wherein a balanced force is applied symmetrically to the braking surfaces.

Further features, objects and advantages of the present invention will be apparent from the accompanying drawings and following detailed description.

In the drawings,

FIG. 1 is a longitudinal sectional view taken through the dynamometer embodying the features of the present invention.

FIG. 2 is a transverse sectional view taken on line 2—2 of FIG. 1.

FIG. 3 is a transverse sectional view taken on line 3—3 of FIG. 1.

FIG. 4 is an end elevational view of the dynamometer.

FIG. 5 is a detailed sectional view of a modified reaction cylinder.

Referring in detail to the drawing, the dynamometer embodying the present invention comprises essentially a power absorption unit 1 and a torque measuring mechanism 2. The power absorption unit comprises a casing having a base 3, end walls 4 and 5, opposite side walls 6 and an open top. The casing is adapted to be liquid-tight and, as will be hereinafter more fully described, means is provided for circulating a cooling liquid through the casing. A closure 7 is contemplated for the open top of the casing, the closure carrying downwardly extending flanges 8 around its periphery. A gasket 9 is carried by the closure, said gasket being slotted to receive the upper defining edges of the side and end walls. The gasket may be constructed of resilient rubber or other suitable gasket material.

A hook 10 is secured to each of the end walls 4 and 5, preferably by welding 11, and similar hooks 12 are similarly secured to the side walls 6, the hooks 10 and 12 being disposed adjacent the corners of the casing which is preferably rectangular in horizontal section. Eyebolts 13 are adatped to engage with the hooks 10 and 12, the upper ends of the eyebolts carrying screw threads 14. The upper ends of the eyebolts extend through suitable apertures in the closure 7 and nuts 15 engage the threaded ends of the eyebolts to securely seat the closure 7 upon the open end of the casing, the gasket 9 rendering the closure liquid tight.

End wall 5 of the casing is provided with an opening 16 in which a bushing 17 is carried, said bushing being secured by bolts 18 to the wall. A shaft 19 extends through the bushing 17 from the exterior of the casing to the interior thereof and a seal 20, carried by the bushing, embraces the shaft 19 within the casing to prevent liquid from within the casing leaking along the surface of the shaft exteriorly of the casing. A bearing housing 21 is secured by bolts 22 to the bushing 17 and said bearing housing carries a ball bearing assembly 23. The ball bearing assembly comprises an outer race 24 which is carried by the bearing housing and an inner race 25 which comprises essentially a hardened sleeve which embraces the shaft 19 exteriorly of the housing. A collar 26 is rigidly secured to the shaft 19 by means of set screw 27, said collar holding the sleeve 25 in position. A conventional coupling 28 is secured to the end of the shaft 19 by means of set screw 29, said coupling being adapted to engage with a companion coupling carried by the prime mover (not shown) under test. Of course, any suitable type of coupling is contemplated.

Within annular space 30 provided by the bushing 17 and bearing housing 21 a grooved pulley 31 is positioned, said pulley being rigidly secured to shaft 19. A block 31' is also secured to the outer surface of wall 5 and said block carries a shaft 32 journaled in ball bearings 33. A shaft 32 carries a grooved pulley 34 and an endless belt 35 operatively connects pulley 31 and pulley 34 to rotate shaft 32 in timed relationship with the rotation of shaft 19. The shaft 32 carried by the block 31' is connected to a flexible cable 36 which is housed within a suitable sheath 37, the cable at its opposite end being connected to a conventional tachometer 38 whereby the speed of shaft 19 may be measured.

Within the casing, shaft 19 carries a flanged coupling 39 which is rigidly secured to the shaft. The coupling 39 carries screws 40 which engage in an end wall 41 of a drum 42, a gasket 43 being positioned between the flanged coupling 39 and the wall 41.

The drum 42 is cylindrical and the side wall 44 thereof carries a plurality of ribs or fins 45. The drum 42 is open at the end thereof opposite the end wall 41 and a closure 46 functions, as will be hereinafter more fully described, to completely close the drum.

End wall 4 of the outer casing carries a hose coupling 47 controlled by a valve 48, the hose coupling 47 being adapted to be connected with a suitable source of cooling liquid. A pipe 49 (FIG. 3) extends through the base 3 of an outer housing and extends upwardly into the interior of the housing, said pipe opening adjacent the central portion of the housing. The pipe 49 is adapted to be connected to a suitable conduit whereby cooling liquid under a desired pressure may be introduced through the coupling 47 into the casing and discharged through pipe 49. In the normal operation of the device the interior of the casing is adapted to be completely filled with cooling liquid as indicated at 50 in FIG. 3, said liquid entering through the coupling 47 and discharging through the outlet 49 at a rate so controlled as to keep the interior of the casing substantially filled. In view of the fact that the interior of the casing is adapted to be completely filled with liquid, it can readily be seen that the drum 42 will be completely immersed in the liquid. Hence, precautions are taken to render the interior of the drum liquid-tight.

The end wall 4 of the liquid casing is provided with a central aperture 51 and a bushing 52 is positioned in said aperture, said bushing being secured to wall 4 by means of bolts 53 or the like. The bushing 52 carries a self-aligning bearing 54 which in turn functions as a bearing for a shaft 55 which extends through the bushing into the interior of the liquid casing. The end wall 41 of drum 42 is provided with a central aperture 56 and the inner end of shaft 55 extends into said aperture. A ball bearing assembly 57 is positioned between the defining walls of the aperture 56 and the end of shaft 55. The closure 46 for the drum, opposite end wall 41 thereof, is secured to the open end of the drum by means of screws 58. The central portion of the closure 46 is provided with a central opening 59 between which and shaft 55 a ball bearing assembly 60 is positioned. Thus, when shaft 19 is rotated by the prime mover, the drum 42 will be rotated and will rotate independently of shaft 55, the freedom of relative rotation being accomplished by the ball bearing assemblies 57 and 60. A sleeve 61 is rigidly secured in the opening 59, said sleeve circumscribing shaft 55 and extending outwardly from the drum. Packing rings 62 and 63 are carried by the sleeve 61 and prevent liquid from the interior of the casing from moving along shaft 55 into the drum through opening 59. A packing ring 64 circumscribes the sleeve 61 and is confined between said sleeve and flange 65 of bushing 52. Thus, liquid which may seep past packing ring 64 will enter the space 66 and move into the space 67 and there will be little or no tendency for such liquid to move along shaft 55 beneath the packing rings 62 and 63.

A holder 68 is positioned upon the torque shaft 55 and is rigidly secured thereto by a suitable key (not shown) or other suitable securing means. The holder 68 comprises a cylinder block 69 which terminates adjacent shaft 55 in a hub portion 70. Rings 71 embrace shaft 55 and one such ring is disposed adjacent and secured to each end of hub portion 70 by means of screws 72. Each of the rings 71 is provided with an annular recess which carries a packing ring 73.

The cylinder portion 69 of the holder 68 comprises an annular casting which, in preferred form, carries four cylinders 74 which are angularly spaced 90° from each other, the axes of the cylinders extending radially with respect to the torque shaft 55. The cylinders 74 open toward shaft 55 at their inner radial ends and open into the interior of drum 42 at their outer radial ends.

An axial bore 75 is provided in torque shaft 55 and adjacent the cylinders 74 radial bores 76 connect the axial bore 75 to the inner end of each cylinder. A piston 77 is slidably positioned in each cylinder 74 and conventional piston rings 78 provide a sliding seal for each piston-cylinder arrangement.

The head of each piston 77 carries a segmental spherical ball 79, which, in turn, loosely seats in a companion socket 80 provided in a force-producing brake shoe 81. Each brake shoe 81 is provided with a pair of spaced transverse grooves 82. To hold the brake shoes 81 in seated position upon the balls 79 a pair of coil springs 83 are disposed in the grooves 82 of diametrically opposite brake shoes 81. One respective end of each spring 83 carries a hook 84 and the opposite end of each spring carries an eye 85, whereby, when each spring is operatively mounted, an endless spring circumscribes and exerts a resilient force upon the respective end portions of each diametrically opposite shoe 81. Thus, four virtually endless coil springs 83 function resiliently to hold the four shoes 81 in properly seated position upon the balls 79 of each piston 77.

The holder 68 also carries four radial projections 86 which are angularly spaced 90° from each other and are angularly spaced 45° from respective adjacent cylinders 74. The projections 86 are arcuate at their radial extremities and terminate short of, but closely adjacent, the inner surface of the cylindrical wall of the drum 42.

Between each pair of projections 86 an arcuate friction element 87 is positioned, each friction element being disposed between the outer surface of each shoe 81 and the inner surface of the cylindrical wall of the drum 42. As will be hereinafter more fully described, the friction elements are loosely positioned in the spaces defined by adjacent projections 86, a shoe 81, a portion of the interior wall of the drum 42, and the end walls 41 and 46 of the drum. This arrangement greatly facilitates the insertion and removal of the friction elements since it is merely necessary, after the closure 46 has been removed from the drum, to axially slide the friction elements into or out of operative position.

In the operation of the device, fluid under pressure is introduced into each cylinder 74 from the bores 75 and 76, as will be hereinafter more fully described, to urge simultaneously the pistons 77 radially outwardly. The shoes 81 are thus simultaneously urged radially outwardly into contact with the friction elements 87 which latter are thereby urged into frictional contact with the interior wall of the drum.

It will be noted that the radial force exerted by each piston acts along the axis of the cylinder and piston and, hence, there is a tendency for the force to be more or less concentrated at the central portion of each friction element. To more uniformly distribute the force delivered by the pistons over the entire arcuate outer surface of the friction elements, each shoe 81 is provided with a central flattened portion 88 which is spaced from contact with the interior surface of each friction element. Thus, the concentration of force at the central portion of each friction element is more uniformly distributed over the entire area of the friction element.

To supply fluid under pressure for urging the pistons 77 outwardly, a suitable fluid coupling 89 may connect with the axial bore 75 in torque shaft 55. A fluid pump 90, of conventional construction, may connect with the coupling 89 and function to supply the fluid under the necessary pressure. In view of the fact that the volume of fluid necessary to move the pistons is relatively small, pump 90 may conveniently be a hand pump manipulated by lever 91. The pump 90 may also be provided with a pressure release 92 to relieve the pressure in the cylinders when it is desired to retract the shoes 81. When the pressure is released, springs 83 retract the pistons 77 and shoes 81.

The device thus far described is essentially a power absorption unit and operates as follows: The outer fluid casing is first closed by positioning the closure 7 upon the upper end thereof and manipulating the nuts 15 to render the closure liquid-tight. The coupling 28 may be connected to the prime mover, the mechanical power of which is thereby absorbed or converted. A cooling liquid under pressure is circulated through the outer casing at a desired rate so controlled as to keep the interior of the casing substantially completely filled with liquid. The circulation of the liquid is such that as the liquid acquires heat from the operation of the device it is removed but the removal is so controlled as to not deplete the body of liquid in the casing. A suitable pump (not shown) may function to circulate the cooling liquid and if the cooling liquid is to be maintained in a closed circuit, a suitable radiator or heat exchanger will be incorporated in the piping circuit exteriorly of the casing.

When the prime mover is actuated the drum 42 rotates therewith. Of course, the rotation of the drum, in itself, furnishes only a small load upon the prime mover. To augment the load, the pump 90 may be actuated to supply fluid under pressure to the cylinders 74. The pistons are thereby urged radially outwardly, in turn, moving the shoes 81 outwardly into pressure contact with the inner surfaces of the arcuate friction elements 87. The outer surfaces of the friction elements 87 are thus brought into frictional contact with the inner surface of the cylindrical wall of the drum 42. Initially the friction elements 87 tend to move circularly with the drum, this initial movement being accommodated by the clearance spaces between the ends of the friction elements and the projections 86. Thereafter the frictional contact of the friction elements and the interior of the drum functions to exert a torque upon the holder 68 which, in turn, is transmitted to the torque shaft 55. If the device is to be used merely as a power absorption unit, the torque shaft 55 may be locked exteriorly of the casing by any suitable means.

In this fashion a controlled load may be applied to the prime mover. The mechanical movement of the prime mover is thereby converted into heat which is generated at the contacting surfaces of the friction elements 87 and the drum 42. In view of the fact that the entire drum is immersed in a body of cooling liquid and that this liquid is circulated through the drum, provides means for removing the heat generated at the friction surfaces. To facilitate the heat transfer from the frictional contacting surfaces, the outer cylindrical wall of the drum is provided with fins or ribs 45 which increases the area of contact of the cooling medium and the drum wall. In addition, the ribs 45 function to prevent distortion of the cylindrical wall of the drum when said wall is subjected to the frictional heat and is also subjected to the radial pressures exerted by the friction elements 87.

It is of importance, whether the device comprising the present invention is employed as a power absorption device or as a dynamometer, that the load applied to the prime mover be as constant as possible. Hence, by preventing distortion of the cylindrical wall of the drum 42, the friction elements will make uniform contact with the interior surface of the wall. In addition, by virtue of the flattened portions 83 of the shoes 81, the radial forces applied by the pistons 77 will be more uniformly distributed over the contact area of the friction elements 87 and the drum and no local hot spots will develop in the frictional contact areas. If such hot spots were to develop, the friction materials would not only be unduly worn but their coefficient of friction would be nonuniform.

It will be noted that the force-applying agents, that is, the pistons 77, are symmetrically disposed relative to the axis of the torque shaft 55. Four such actuating pistons are shown and constitute the preferred arrangement. However, more cylinder and piston pairs may be employed, for instance, six piston-cylinder arrangements may be employed. If, however, in the use of the device it is not necessary to apply a uniform load to the prime mover, three or more piston-cylinder pairs may be employed with the appropriate number of shoes and friction elements.

The friction elements 87 may comprise any suitable friction material such as the conventional resin bonded asbestos friction material or, if desired, the elements may comprise conventional powdered metal friction materials or may even comprise solid metal friction elements.

When the device embodying the concepts is to be used as a dynamometer, instead of blocking the torque shaft 55, an arm 93 of predetermined length carries a sleeve 94 which is keyed by key 95 to the end portion of the torque shaft exteriorly of the cooling liquid casing. A reaction cylinder housing 96 is pivotally mounted upon the wall 4 of the cooling liquid casing. Although, the device shown in FIG. 5 is a slight modification of the invention, the casing 96 and casing 96' of the modification are pivotally mounted in the same fashion. Hence, the pivotal mounting of casing 96' will be described in detail, it being understood that the casing 96 is mounted in the identical manner.

A portion of casing 96 carries a flange 97 and casing 96' carries an identical flange 97'. An aperture 98' is provided in flange 97' and an identical aperture is provided in flange 97. A bearing 99' is secured to wall 4 and extends loosely through aperture 98'. A locking ring 100' prevents removal of the flange 97' from its position on the bearing 99'. An arcuate groove 101' is provided in the wall of the casing 96', said arcuate groove having a radius of curvature equal to the distance from the axis of bearing 99' and the axial center of the groove 101'. Ball bearings, one of which is shown at 102' in FIG. 5, are carried in the groove 101' whereby swingable movement of the casing 96' upon bearing 99' is facilitated. The identical structure is also contemplated in casing 96.

A hardened steel spherical abutment 103 is carried by arm 93 adjacent its free end, the abutment bearing upon the head of a piston 104 slidably positioned in cylinder 105 provided in casing 96. A coupling 106 connects into the lower portion of cylinder 105 and a conduit 107 connects the coupling to a conventional fluid pressure gauge 108. When the pistons 77 are retracted, that is, when no torque is applied to shaft 55, the cylinder 105 beneath piston 104 together with the conduit 107 and all connecting liquid space, is filled with liquid. The arrangement is such when pistons 77 are actuated to load the prime mover, as hereinbefore described, a torque is applied to shaft 55 tending to rock arm 93 and depress piston 104. Pressure is thereby established in the liquid in cylinder 105 and said pressure is indicated upon the meter 108. Relating the radius arm of drum 42 to the radius arm of arm 93 and the area of piston 104, the meter 108 may be calibrated in terms of torque.

In practice, the pump 90 and meter 108 may be positioned at a control station which may, if desired, be positioned remote from the dynamometer. Thus, the actuation of the device and the resultant torque indications are convenient to the operator. To secure a power measurement the tachometer 38 may also be positioned at the control station and, if desired, the calibrations of meter 108 may be related to r.p.m. of the drum to give a direct indication of power.

Referring particularly to FIG. 5, parts of which have already been described, the casing 96' is provided with cylinder 105' in which a piston 104' may be slidably positioned. With the exception of piston 104', the reaction unit 2 is the same as has been hereinbefore described.

The piston 104' is a compound assembly, the piston comprising a sleeve 109 which is slidably positioned in cylinder 105' within which a second piston 110 is slidably carried. It can readily be seen that the piston 104' as a while is of a predetermined area and the piston 110 is of a smaller predetermined area. Hence, the liquid beneath the piston 104' and the liquid spaces connected there to can be pressurized by either of said pistons. Thus for a predeterminted torque output of shaft 55 different readings will appear on meter 108 which are related to each other in proportion to the relationship of the area of piston 104' as a whole and the area of piston 110 alone.

The sleeve 109 of piston 104' carries a locking ring 111 which engages in the cylinder wall. In addition, piston 110 carries a locking ring 112 which, when the arm 93 moves to pressurize the liquid in cylinder 105', abuts against the top of sleeve 109. The arrangement is such, that by removing ring 111 operative movement of arm 93 will cause piston 104' to descend as a unit, utilizing the full area of piston 104' to pressurize the reaction liquid, whereas if ring 112 is removed only piston 110 will be actuated to pressurize the reaction liquid. If ring 112 is removed, of course, it is immaterial whether ring 111 is in place or not since the force transmitted by arm 93 will only be applied to piston 110.

Thus, the ranges of torque or power measured by meter 108 may be varied and meter 108 may be calibrated accordingly.

In applying the torque of shaft 55 to pistons 104 or 104', considerable pressure is established between ball 103 and the top of the piston. As has been hereinbefore described, ball 103 is preferably constructed of hardened steel to better withstand this pressure. Likewise the heads of pistons 104 or 104' may be constructed of hardened steel or hardened steel inserts (not shown) may be carried by said piston heads.

Further, ball 103 is carried by arm 93 and, hence, when said arm moves, ball 103 moves in an arc. Hence, the tangent position occupied by the ball is along an arc and if the casings 96 and 96' were stationary, a sliding contact would occur between the ball 103 and the heads of pistons 104 or 104'. Considerable wear would thus take place at the contacting surfaces and the force of ball 103 would not always be transmitted along the axis of the piston. However, by the provision of bearing 99', or its equivalent relative to casing 96, the casings 96 or 96' are swingable and thus, when the force of ball 103 is brought to bear on the piston head the casing will swing until said force acts along the axis of the piston 104 or 104'. This expedient prolongs the life of the contacting surfaces, the ball and piston heads. In addition, a more efficient transmission of force occurs between the ball and piston head and the piston will also be relieved of a lateral thrust which would otherwise occur.

As has been hereinbefore described, the present device may be used as a power absorption or conversion unit or a dynamometer and in either use its manifest advantages are numerous. Modifications of use and environment are contemplated and unpatentable structurel modifications will occur to one skilled in the art. Hence, it is not intended that the invention be limited to the exact details shown and described except as necessitated by the appended claims.

I claim as my invention:

1. A dynamometer which comprises, a casing for cooling liquid, means for passing a cooling liquid into and through said casing, a hollow drum carried in said casing and in contact with the cooling liquid in said casing, means for rotating said drum in said casing from a prime mover under test exteriorly of said casing, braking means within said drum for frictionally contacting the inner wall of said drum, a torque-shaft extending through said casing and drum for carrying said braking means in said drum to transmit torque occasioned by engagement of said braking means and drum, and torque-measuring means connected to said torque-shaft exteriorly of said casing for measuring the torque of said torque-shaft.

2. A dynamometer which comprises, a closed casing for cooling liquid, means for passing a cooling liquid into and through said casing, a hollow drum carried in said casing and in contact with the cooling liquid in said casing, means for rotating said drum in said casing from a prime mover under test exteriorly of said casing, braking means within said drum for frictionally contacting the inner wall of said drum, a torque-shaft extending through said casing and drum for carrying said braking means in said drum to transmit torque occasioned by engagement of said braking means and drum, torque-converting means connected to said torque-shaft exteriorly of said casing for converting torque to liquid pressure, and means connected to said torque-converting means for measuring said liquid pressure in said torque-converting means.

3. A dynamometer which comprises, a casing for cooling liquid, means for circulating a cooling liquid through said casing, a closed hollow drum carried in said casing and in contact with the cooling liquid in said casing, means for rotating said drum in said casing from a prime mover under test exteriorly of said casing, braking means within said drum for frictionally contacting the inner wall of said drum, said braking means including hydraulic means for urging said braking means into frictional contact with said inner wall of the drum, a torque-shaft extending through said casing and drum for carrying said braking means in said drum to transmit torque occasioned by actuation of said hydraulic means, means exteriorly of said casing connected to said hydraulic means for controlling the actuation of said hydraulic means, and torque-measuring means connected to said torque-shaft exteriorly of said casing for measuring the torque of said torque-shaft.

4. A dynamometer which comprises, a casing for cooling liquid, means for circulating a cooling liquid through said casing, a closed hollow drum carried in said casing with its exterior in contact with the cooling liquid in said casing, a shaft extending through a wall of said casing and connected to said drum for rotating said drum in said casing from a prime mover under test exteriorly of said casing, braking means within said drum for frictionally contacting the inner wall of said drum, a torque-shaft extending through said casing and drum carrying said braking means in said drum to transmit torque occasioned by engagement of said braking means and drum, torque-converting means connected to said torque-shaft exteriorly of said casing for converting torque to liquid pressure, and means connected to said torque-converting means for measuring said liquid pressure in said torque-converting means.

5. A dynamometer which comprises, a casing for cooling liquid, means for passing a cooling liquid into and through said casing, a hollow drum carried in said casing and in contact with the cooling liquid in said casing, means for rotating said drum in said casing from a prime mover under test exteriorly of said casing, braking means within said drum for frictionally contacting the inner wall of said drum, a torque shaft extending through said casing and drum for carrying said braking means in said drum to transmit torque occasioned by engagement of said braking means and drum, said braking means comprising a holder carried by said torque-shaft within said casing, said holder carrying a plurality of angularly spaced cylinders, a piston in each cylinder, friction engaging means carried by each piston for frictional engagement with the inner wall of the drum when said pistons are moved, and means exterior of said casing and drum for actuating said pistons to engage said friction engaging means and with said drum to apply torque to said torque-shaft, and torque-measuring means connected to said torque-shaft exteriorly of said casing for measuring the torque of said torque-shaft.

6. A dynamometer which comprises, a casing for cooling liquid having opposite end walls, means for circulating a cooling liquid through said casing, a closed hollow drum rotatably carried in said casing with its exterior surface in contact with the cooling liquid in said casing, a shaft extending through one of said casing end walls and connected to said drum for rotating said drum from a prime mover under test exterior of said casing, a torque-shaft extending through the opposite end wall of the casing and through said drum, said torque-shaft being relatively rotatable with respect to said drum, a holder carried by said torque-shaft within said drum, oppositely disposed radially extending cylinders carried by said holder, a piston in each cylinder, a shoe carried by the head of each piston, a segment of friction material disposed radially outwardly from each shoe and disposed adjacent the inner wall of the drum, said torque-shaft being provided with a bore connecting the radial inner end of each cylinder with the exterior of said casing, means connected to the outer end of said bore for passing liquid under pressure through said bore and into said cylinders to frictionally engage said friction material and the inner wall of said drum and transmit torque from said drum to said torque-shaft, and means connected to said torque-shaft exteriorly of said casing for measuring the torque thereof.

7. A device as claimed in claim 6 wherein driving means is carried by said first-mentioned shaft, and a tachometer is remotely connected to said driving means for measuring the rate of rotation of said first mentioned shaft.

8. A device as claimed in claim 7 wherein said means for passing liquid under pressure to said cylinders is remote from said casing.

9. A device as claimed in claim 8 wherein said torque-measuring means is remote from said casing.

10. A dynamometer which comprises, a casing for cooling liquid having opposite end walls, means for circulating a cooling liquid through said casing, a closed hollow drum rotatably carried in said casing with its exterior surface in contact with the cooling liquid in said casing, a drum-driving shaft extending through one of said casing end walls and connected to said drum for rotating said drum from a prime mover under test exterior of said casing, a torque-shaft extending through the opposite end wall of the casing about which said drum is rotatably disposed, said torque-shaft being in axial alignment with said drum-driving shaft, a holder carried by said torque-shaft within said drum, friction engaging means carried by said torque-shaft within said drum, means disposed exteriorly of said casing for actuating said friction engaging means to frictionally engage said torque-shaft and drum and apply torque to said torque-shaft, and means connected to said torque-shaft for measuring the torque thereof.

References Cited in the file of this patent

UNITED STATES PATENTS

| 2,028,374 | Anderson | Jan. 21, 1936 |
| 2,048,053 | Bennington | July 21, 1936 |
| 2,162,757 | Shaw | June 20, 1939 |
| 2,191,261 | Roberts | Feb. 20, 1940 |
| 2,392,702 | Saunders | Jan. 8, 1946 |
| 2,719,620 | McDonald | Oct. 4, 1955 |
| 2,928,509 | Del Sole | Mar. 15, 1960 |

FOREIGN PATENTS

| 583,956 | Great Britain | Jan. 3, 1947 |